United States Patent
Kunihiro et al.

(10) Patent No.: US 10,870,448 B2
(45) Date of Patent: Dec. 22, 2020

(54) DRIVING SUPPORT CONTROL SYSTEM

(71) Applicant: TOYOTA JIDOSHA KABUSHIKI KAISHA, Toyota (JP)

(72) Inventors: Yoji Kunihiro, Susono (JP); Masateru Amano, Shizuoka-ken (JP)

(73) Assignee: TOYOTA JIDOSHA KABUSHIKI KAISHA, Toyota ( * ) Notice: Subject to any disclaimer, the term of this patent is extended or adjusted under 35 U.S.C. 154(b) by 0 days.

(21) Appl. No.: 16/106,156

(22) Filed: Aug. 21, 2018

(65) Prior Publication Data
US 2019/0106149 A1 Apr. 11, 2019

(30) Foreign Application Priority Data
Oct. 11, 2017 (JP) ................................ 2017-197877

(51) Int. Cl.
*B62D 6/04* (2006.01)
*B60W 30/12* (2020.01)
(Continued)

(52) U.S. Cl.
CPC ............... *B62D 6/04* (2013.01); *B60W 10/20* (2013.01); *B60W 30/12* (2013.01); *B62D 15/021* (2013.01); *B62D 15/025* (2013.01); *B62D 15/0255* (2013.01); *B60W 30/18145* (2013.01); *B60W 30/18163* (2013.01); *B60W 2050/046* (2013.01); *B60W 2420/42* (2013.01);
(Continued)

(58) Field of Classification Search
CPC ...... B62D 6/04; B62D 15/025; B62D 15/021; B62D 15/0255; B62D 6/005; B62D 5/046; B62D 6/00; B60W 10/20; B60W 30/12; B60W 30/18163; B60W 2420/52; B60W 2050/046; B60W 2420/42; B60W 30/18145; G05D 1/0278
See application file for complete search history.

(56) References Cited

U.S. PATENT DOCUMENTS

| | | | |
|---|---|---|---|
| 2013/0041557 A1* | 2/2013 | Endo ...................... | B62D 1/286 701/42 |
| 2017/0057544 A1 | 3/2017 | Matsuno et al. | |
| 2019/0002019 A1* | 1/2019 | Tsubaki ............... | B62D 5/0472 |

FOREIGN PATENT DOCUMENTS

| | | |
|---|---|---|
| JP | 2006-001420 A | 1/2006 |
| JP | 2017-047798 A | 3/2017 |
| WO | 2017150445 A1 | 9/2017 |

* cited by examiner

*Primary Examiner* — Jess Whittington
*Assistant Examiner* — Brian E Yang
(74) *Attorney, Agent, or Firm* — Sughrue Mion, PLLC (57) ABSTRACT

A driving support control system includes a steering device and a control device. The control device performs a target value calculating process of calculating a target value; a first steering angle calculating process of calculating, as a first steering angle, a steering angle for causing a vehicle motion parameter to coincide with the target value; an actual value calculating process of calculating an actual value of the vehicle motion parameter; a second steering angle calculating process of calculating, as a second steering angle, a steering angle for cancelling out an external force based on a difference value between the actual value and the target value; a target steering angle calculating process of calculating, as a target steering angle, a summed value of the first and second steering angles; and a control process of controlling the steering device so that the steering angle coincides with the target steering angle.

7 Claims, 9 Drawing Sheets

(51) Int. Cl.
    *B60W 10/20*     (2006.01)
    *B62D 15/02*     (2006.01)
    *B60W 30/18*     (2012.01)
    *B62D 5/04*     (2006.01)
    *B62D 6/00*     (2006.01)
    *G05D 1/02*     (2020.01)
    *B60W 50/04*     (2006.01)

(52) U.S. Cl.
    CPC ......... *B60W 2420/52* (2013.01); *B62D 5/046* (2013.01); *B62D 6/005* (2013.01); *G05D 1/0278* (2013.01)

DRIVING SUPPORT CONTROL SYSTEM

INCORPORATION BY REFERENCE

The disclosure of Japanese Patent Application No. 2017-197877 filed on Oct. 11, 2017 including the specification, drawings and abstract is incorporated herein by reference in its entirety.

BACKGROUND

1. Technical Field

The disclosure relates to a driving support control system and more particularly to a driving support control system that controls traveling of a vehicle so that the vehicle follows a target path.

2. Description of Related Art

A technique relating to automatic traveling in which a vehicle is caused to travel automatically to follow a target path is known. When an external force due to a disturbance such as crosswind is applied to a vehicle that is automatically operated, a lateral shift from a target path occurs. Japanese Unexamined Patent Application Publication No. 2017-47798 (JP 2017-47798 A) discloses a technique of performing correction to curb an influence of a disturbance in automatic operation of a vehicle which can travel along a lane. In the technique, it is determined whether a disturbance to be curbed occurs based on a detected lateral acceleration and a lateral acceleration which is estimated using a two-wheeled model of a vehicle. When it is determined that a disturbance has occurred, a yaw moment for performing correction to curb the influence of the disturbance is calculated using a rate of change in a lateral lane position which is a lateral position relative to a lane.

SUMMARY

In the technique disclosed in JP 2017-47798 A, a rate of change in the lateral lane position is used as a parameter which is used to perform correction to reduce an external force due to a disturbance. However, the rate of change in the lateral lane position does not necessarily have a high correlation with an external force acting on the vehicle. Accordingly, in the technique disclosed in JP 2017-47798 A, there is a possibility that an external force acting on a vehicle will not be removed with high accuracy and the vehicle will not be able to follow a target path.

The disclosure provides a driving support control system that causes a vehicle to follow a target path, the driving support control system being able to enhance an accuracy with which the vehicle follows the target path even when an external force acts on the vehicle.

An aspect of the disclosure relates to a driving support control system that is mounted in a vehicle. The driving support control system includes a steering device configured to adjust a steering angle of the vehicle; and a control device configured to control the steering device so that the vehicle travels to follow a target path. The control device is configured to perform a target value calculating process of calculating a target value of a lateral acceleration or a yaw rate as a target value of a vehicle motion parameter for causing the vehicle to travel to follow the target path; a first steering angle calculating process of calculating, as a first steering angle, a steering angle for causing the vehicle motion parameter to coincide with the target value; an actual value calculating process of calculating an actual value of the vehicle motion parameter; a second steering angle calculating process of calculating, as a second steering angle, a steering angle for cancelling out an external force acting on the vehicle from an outside based on a difference value between the actual value and the target value; a target steering angle calculating process of calculating, as a target steering angle, a summed value of the first steering angle and the second steering angle; and a control process of controlling the steering device so that the steering angle of the vehicle coincides with the target steering angle.

In the above-described aspect, the first steering angle calculating process may be configured to calculate, as the first steering angle, a value obtained by multiplying the vehicle motion parameter by a prescribed first gain; and the second steering angle calculating process may be configured to calculate, as the second steering angle, a value obtained by multiplying the difference value by a prescribed second gain.

In the above-described aspect, the first steering angle calculating process may be configured to include a first guarding process of providing an upper limit on an absolute value of the first steering angle or an absolute value of an amount of change in the first steering angle; and the second steering angle calculating process may be configured to include a second guarding process of providing an upper limit on an absolute value of the second steering angle or an absolute value of an amount of change in the second steering angle.

In the above-described aspect, the control device may be configured to further perform an acceleration limiting process of limiting acceleration of the vehicle when the difference value is equal to or greater than a first prescribed determination value.

In the above-described aspect, the acceleration limiting process may be configured to include a process of detecting a vehicle speed of the vehicle; and a process of calculating a deceleration of the vehicle based on the vehicle speed and the difference value.

In the above-described aspect, the acceleration limiting process may be configured to prohibit the acceleration of the vehicle when the difference value is equal to or greater than a second prescribed determination value.

In the driving support control system according to the aspect of the disclosure, the difference value between the actual value and the target value of the lateral acceleration or the yaw rate which is the vehicle motion parameter can be considered to be equivalent to the external force which acts on the vehicle from the outside. Accordingly, it is possible to calculate the steering angle for cancelling out the external force with high accuracy by using the difference value for control. Thus, even when the external force acts on the vehicle, it is possible to calculate the steering angle for causing the vehicle to travel to follow the target path, with high accuracy.

The first steering angle is a target steering angle for causing the vehicle to follow the target path when no external force acts on the vehicle, and the second steering angle is a target steering angle for cancelling out the external force acting on the vehicle. In the driving support control system according to the aspect of the disclosure, the first steering angle and the second steering angle are independently subjected to guarding processes. Accordingly, since it is possible to guard against abnormal values of the steering angles individually, it is possible to prevent an excessive guarding process from being performed.

In the driving support control system according to the aspect of the disclosure, the acceleration of the vehicle is limited when the difference value between the actual value and the target value of the vehicle motion parameter is equal to or greater than the first prescribed determination value. Accordingly, it is possible to enhance controllability when the external force is large and thus to reduce a degree of drift of the vehicle (in other words, an amount of lateral shift of the vehicle).

As described above, according to the aspects of the disclosure, it is possible to provide the driving support control system that causes the vehicle to follow the target path, the driving support control system being able to enhance an accuracy with which the vehicle follows the target path even when the external force acts on the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings. However, it is to be understood that the disclosure is not limited to the embodiments described below, and various modifications may be made within the scope of the disclosure.

Figure 1:
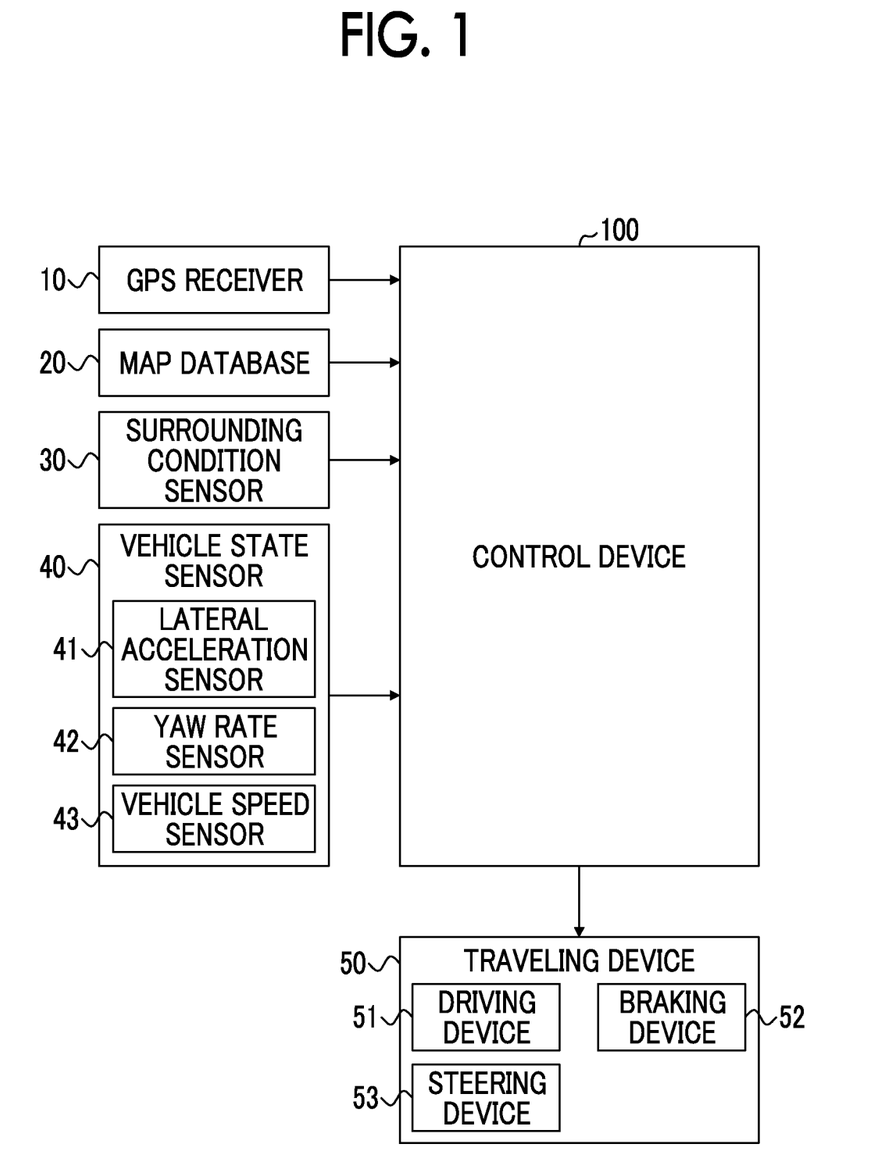
FIG. 1 is a diagram illustrating a configuration of a driving support control system according to a first embodiment.

A first embodiment of the disclosure will be described below with reference to the accompanying drawings. FIG. 1 is a diagram illustrating a configuration of a driving support control system according to the first embodiment. The driving support control system 1 is mounted in a vehicle and controls automatic driving of the vehicle.

The driving support control system 1 includes a global positioning system (GPS) receiver 10, a map database 20, a surrounding condition sensor 30, a vehicle state sensor 40, a traveling device 50, and a control device 100. The GPS receiver 10 receives signals transmitted from a plurality of GPS satellites and calculates a position and an azimuth of the vehicle based on the received signals. The GPS receiver 10 sends the calculated information to the control device 100.

Information indicating boundary positions of lanes on a map is stored in advance in the map database 20. The boundary positions of each lane are expressed as a group of points or a group of lines. The map database 20 is stored in a prescribed storage device.

The surrounding condition sensor 30 detects surrounding conditions of the vehicle. Examples of the surrounding condition sensor 30 include a laser imaging detection and ranging (LIDAR), a radar, and a camera. The LIDAR detects an object near the vehicle using light. The radar detects an object near the vehicle using radio waves. The camera captures an image (or images) of surrounding conditions around the vehicle. The surrounding condition sensor 30 sends the detected information to the control device 100.

The vehicle state sensor 40 detects a traveling state of the vehicle. Examples of the vehicle state sensor 40 include a lateral acceleration sensor 41, a yaw rate sensor 42, and a vehicle speed sensor 43. The lateral acceleration sensor 41 detects a lateral acceleration G that acts on the vehicle. The yaw rate sensor 42 detects a yaw rate Yr of the vehicle. The vehicle speed sensor 43 detects a vehicle speed V of the vehicle. The vehicle state sensor 40 sends the detected information to the control device 100.

The traveling device 50 includes a driving device 51, a braking device 52, a steering device 53, and a transmission. The driving device 51 is a power source that generates a driving force. Examples of the driving device 51 include an engine and an electric motor. The braking device 52 generates a braking force. The steering device 53 turns vehicle wheels. For example, the steering device 53 includes an electronic power steering (EPS) device. The vehicle wheels can be turned by controlling operation of a motor of the electronic power steering device.

The control device 100 performs automatic driving control that controls automatic driving of the vehicle. Typically, the control device 100 is a microcomputer including a processor, a storage device, and an input/output interface. The control device 100 is also referred to as an electronic control unit (ECU). The control device 100 receives various kinds of information via the input/output interface. The control device 100 performs automatic driving control based on the received information.

Figure 2:
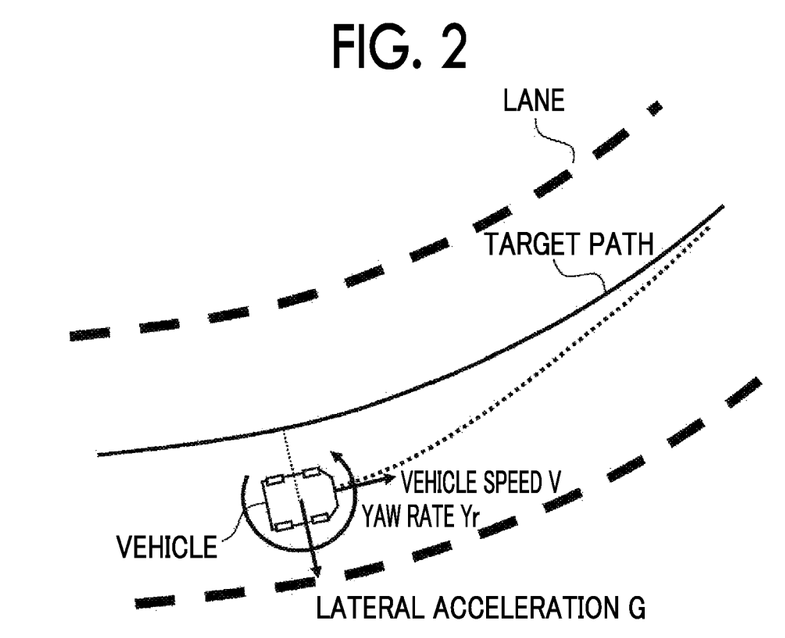
FIG. 2 is a conceptual diagram illustrating path following control which is performed by the driving support control system according to the first embodiment.

FIG. 2 is a conceptual diagram illustrating path following control which is performed by the driving support control system according to the first embodiment. The automatic driving control which is performed by the control device 100 of the driving support control system 1 includes path following control of automatically controlling traveling of the vehicle so that the vehicle follows a target path. In the path following control, the control device 100 periodically calculates a target path for the vehicle and controls traveling of the vehicle so that the vehicle follows a newest (latest) target path.

In the path following control, control of reducing a deviation between the vehicle and a target path is performed to cause the vehicle to follow the target path. Accordingly, parameters such as a lateral deviation, an azimuth angle difference, and a curvature of a target path are considered. The lateral deviation is a deviation in a lateral direction of the vehicle between the vehicle and the target path. The azimuth angle difference is a difference in azimuth angle between the vehicle and the target path. The control device 100 calculates a target value for a vehicle motion for reducing a deviation between the vehicle and the target path based on the parameters such as the lateral deviation, the azimuth angle difference, and the curvature of the target path. For example, a lateral acceleration, a yaw rate, or a vehicle speed of the vehicle can be used as the vehicle motion parameter. The control device 100 calculates target values of the driving force, the braking force, the steering angle, and the like for achieving the calculated target value of the vehicle motion parameter. The control device 100 controls the traveling device 50 including the driving device 51, the braking device 52, and the steering device 53 based on the calculated target value of the vehicle motion parameter. The control device 100 includes various functional blocks for performing the path following control. Details of the functional blocks of the control device 100 will be described later.

Figure 3:
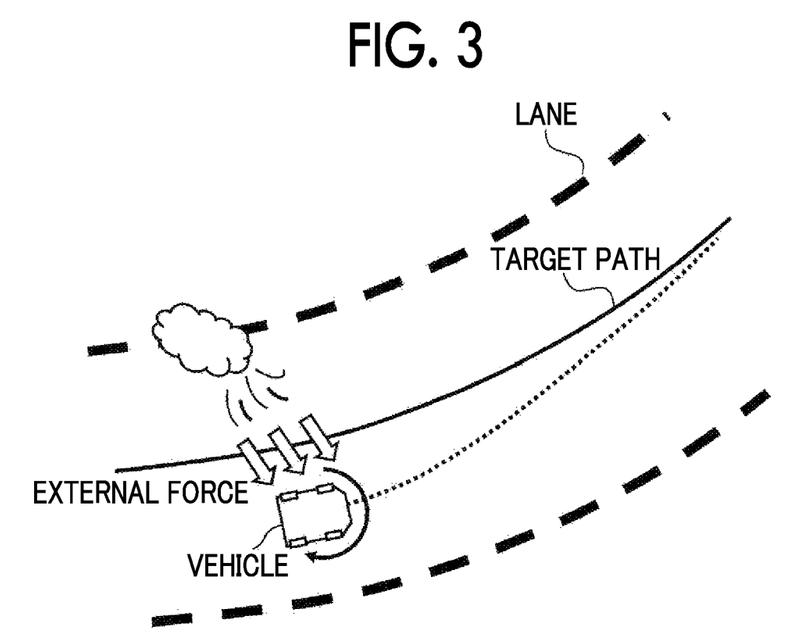
FIG. 3 is a diagram illustrating a problem in path following control.

The inventors have recognized the following problem regarding path following control. FIG. 3 is a diagram illustrating a problem regarding path following control. As illustrated in the drawing, in path following control, there is a possibility that the traveling vehicle will drift in the lateral direction from the target path due to an external force acting from the outside such as crosswind. An influence of an external force can be estimated from, for example, a lateral deviation or a change rate of the lateral deviation. However, a correlation between the external force and the parameters is not necessarily high, and there is a possibility that a drift of the vehicle in the lateral direction (i.e., a lateral shift of the vehicle) due to the external force may not be sufficiently curbed.

Figure 4:
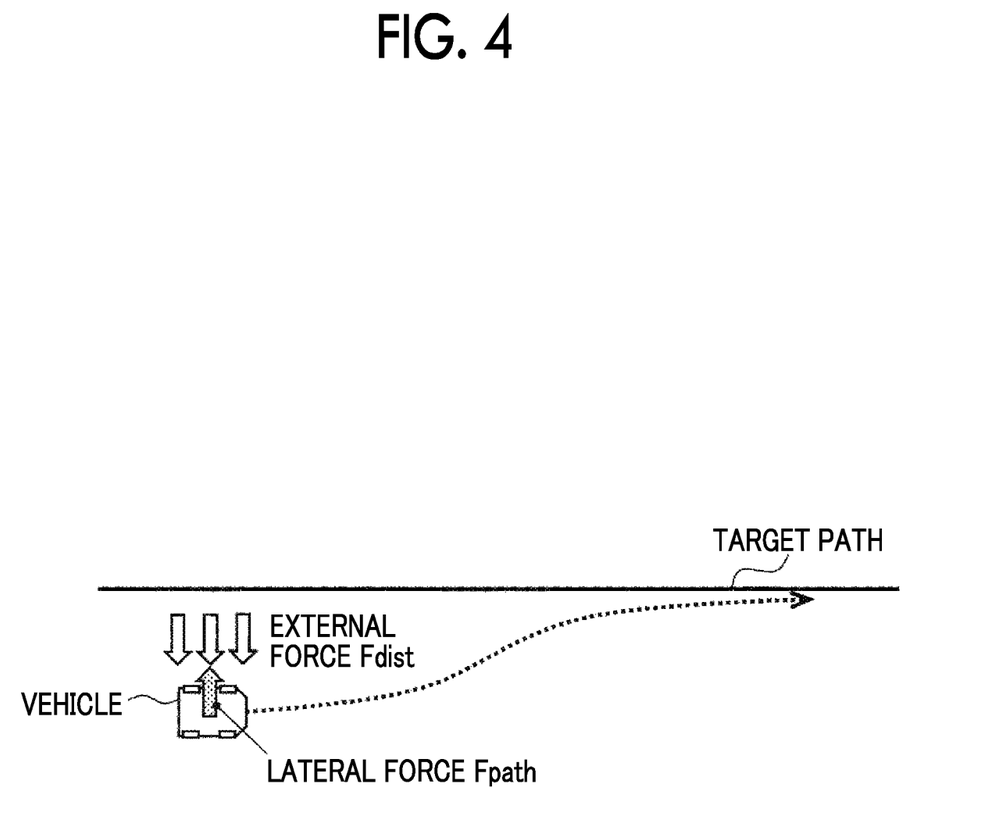
FIG. 4 is a diagram illustrating a force relationship when an external force acts on a vehicle.

Here, a force relationship when an external force acts on the vehicle is considered. FIG. 4 is a diagram illustrating a force relationship when an external force acts on the vehicle. First, a lateral force Fpath for causing the vehicle to follow a target path is expressed by Equation (1) when it is assumed that no external force acts. In this equation, M denotes the mass of the vehicle and Gd denotes a target value of a lateral acceleration.

$$F\text{path} = M \times Gd \qquad (1)$$

When a vehicle motion is regarded as point masses, an actual value Gc of the lateral acceleration required when the vehicle on which an external force Fdist acts follows a target path is expressed by Equation (2).

$$Gc = \frac{F\text{path}}{M} - \frac{F\text{dist}}{M} = Gd - \frac{F\text{dist}}{M} \qquad (2)$$

When Equation (2) is rearranged, the external force Fdist can be expressed by Equation (3).

$$F\text{dist} = M \times (Gd - Gc) \propto \Delta G$$

$$Gd - Gc = \Delta G \qquad (3)$$

In this way, since the external force Fdist is proportional to a difference value $\Delta G$ between the target value Gd and the actual value Gc of the lateral acceleration, the difference value $\Delta G$ of the lateral acceleration can be considered to be equivalent to the external force Fdist. Accordingly, by using the difference value $\Delta G$ of the lateral acceleration for path following control, it is possible to calculate a lateral force for cancelling out the external force Fdist and a steering angle for generating the lateral force.

A relationship between the lateral acceleration Gc and the yaw rate Yr which act on the vehicle can be expressed by Equation (4). In this equation, V denotes a vehicle speed of the vehicle.

$$Gc \approx V \times Yr = \propto Yr \qquad (4)$$

In this way, the lateral acceleration Gc is proportional to the yaw rate Yr. Accordingly, a difference value between a target value and an actual value of the yaw rate Yr can be considered to be equivalent to the external force Fdist. Accordingly, by using the yaw rate Yr for path following control, it is also possible to calculate a lateral force for cancelling out the external force Fdist and a steering angle for generating the lateral force.

Figure 5:
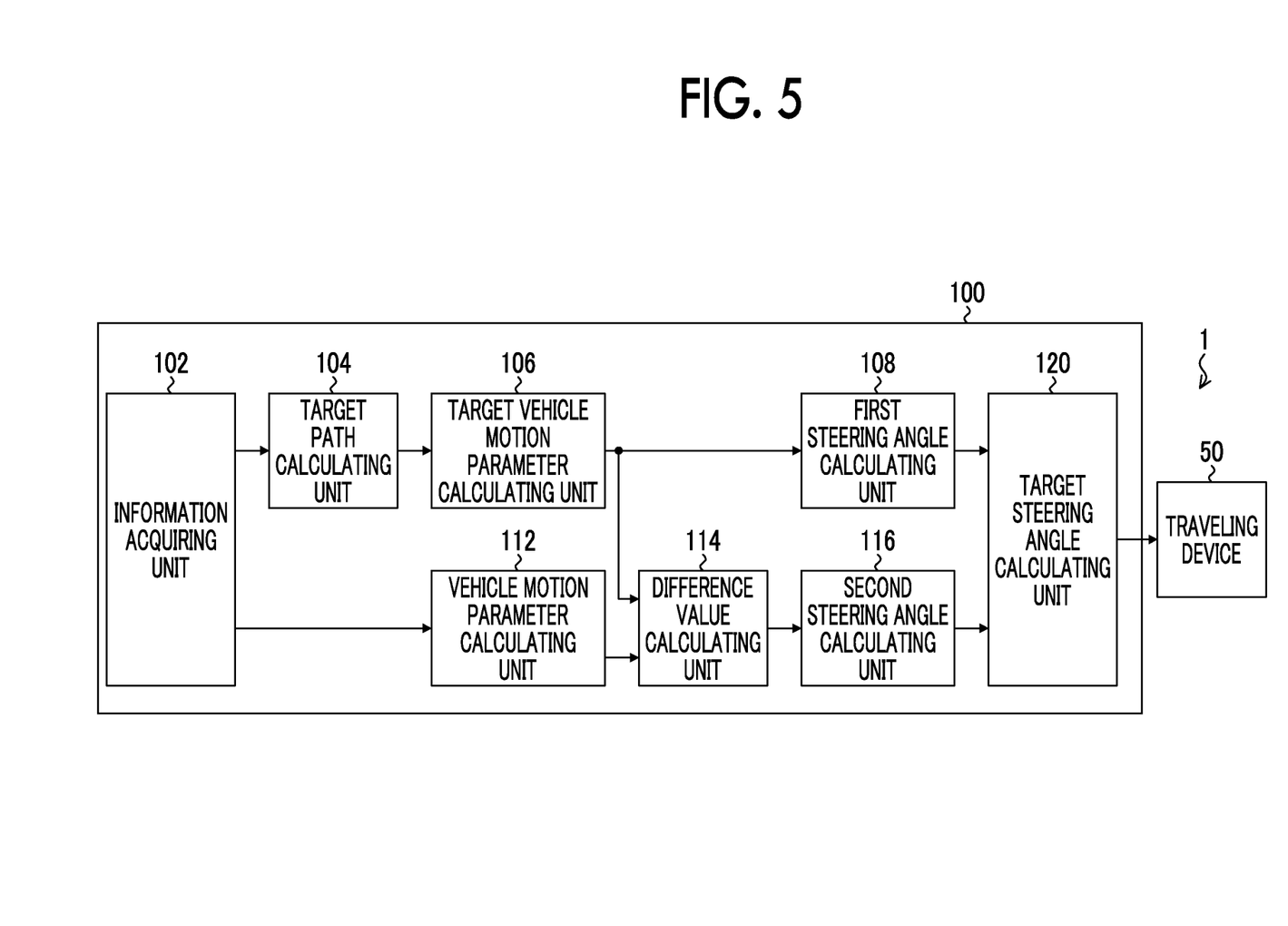
FIG. 5 is a diagram illustrating functional blocks of a control device of the driving support control system according to the first embodiment.

A path following control process which is performed by the driving support control system 1 according to the first embodiment will be specifically described below with reference to functional blocks of the control device 100. FIG. 5 is a diagram illustrating functional blocks of the control device of the driving support control system 1 according to the first embodiment. The functional blocks are implemented by causing the processor of the control device 100 to execute a control program stored in the storage device. The control program may be stored in a computer-readable recording medium.

As illustrated in FIG. 5, the control device 100 includes an information acquiring unit 102. The information acquiring unit 102 acquires information required for the path following control. The information acquiring process performed by the information acquiring unit 102 is repeatedly performed at prescribed cycles. Specifically, the information acquiring unit 102 acquires position and azimuth information indicating a current position and a current azimuth of the vehicle from the GPS receiver 10.

The information acquiring unit 102 reads information on a lane from the map database 20 and generates lane information. The lane information includes an arrangement (such as a position, a shape, and a gradient) of each lane on a map. The information acquiring unit 102 can acquire information regarding merging, branching, intersection, and the like of lanes based on the lane information. The information acquiring unit 102 generates surrounding conditions information based on the information detected by the surrounding condition sensor 30. The surrounding conditions information includes object information on an object near the vehicle. Examples of the object include a white line, a road-side object, and a nearby vehicle. The information acquiring unit 102 acquires vehicle state information based on the information detected by the vehicle state sensor 40. The vehicle state information includes information on a vehicle speed, a steering angle, a yaw rate, a lateral acceleration, and the like of the vehicle.

The control device 100 includes a target path calculating unit 104. The target path calculating unit 104 performs a target path calculating process. Specifically, the target path calculating unit 104 reads information required for calculating a target path such as the position and azimuth information, the lane information, and the surrounding conditions information from the information acquired by the information acquiring unit 102. The target path calculating unit 104 calculates a target path based on the read necessary information. Various methods have been proposed as a target path calculating method. The target path calculating unit 104 calculates a target path based on such known calculation methods.

Figure 6:
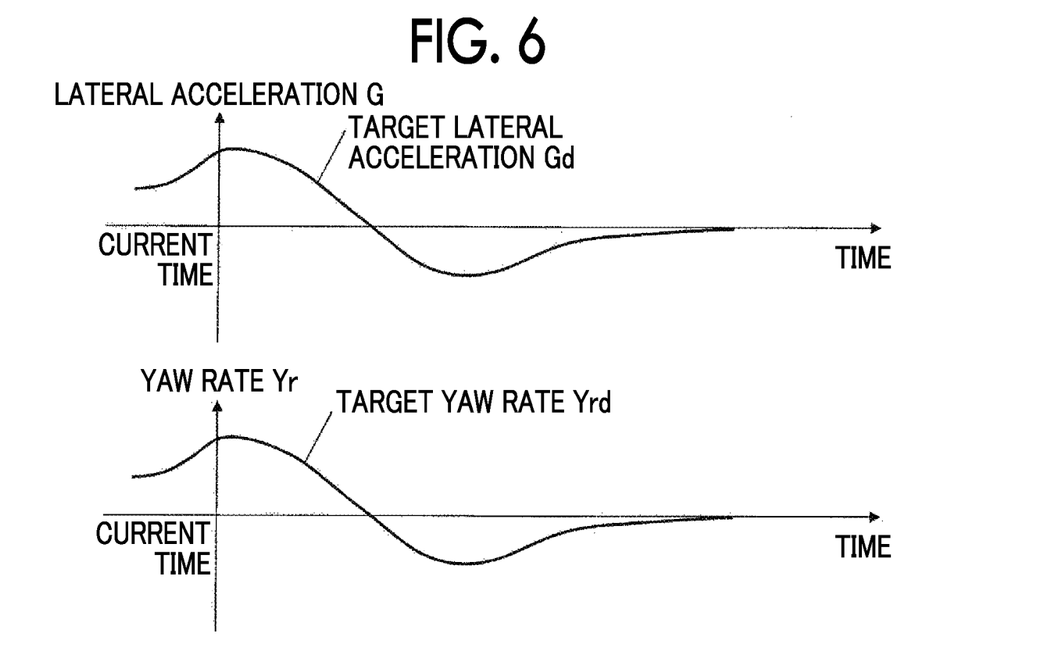
FIG. 6 is a diagram illustrating an example of a target lateral acceleration and a target yaw rate.

The control device 100 includes a target vehicle motion parameter calculating unit 106. The target vehicle motion parameter calculating unit 106 performs a process of calculating a target value of a vehicle motion parameter required for causing the vehicle to follow the target path based on the assumption that no external force acts on the vehicle. Here, the vehicle motion parameter is a lateral acceleration G of the vehicle. A target vehicle motion parameter, which is a target value of the vehicle motion parameter, is a target lateral acceleration Gd. The vehicle motion parameter may be a yaw rate Yr of the vehicle and the target vehicle motion parameter may be a target yaw rate Yrd. The target vehicle motion parameter calculating unit 106 calculates parameters such as a lateral deviation, an azimuth angle difference, and a curvature of a target path based on information acquired by the information acquiring unit 102 and information on the target path calculated by the target path calculating unit 104. The target vehicle motion parameter calculating unit 106 calculates the target lateral acceleration Gd or the target yaw rate Yrd for reducing a deviation between the vehicle and the target path based on the calculated parameters. FIG. 6 illustrates an example of the target lateral acceleration and the target yaw rate which are calculated in this way.

The control device 100 includes a first steering angle calculating unit 108. The first steering angle calculating unit 108 performs a process of calculating a steering angle required for achieving the target vehicle motion parameter. In the following description, this steering angle is referred to as a "first steering angle δpath." For example, when the vehicle motion parameter is a lateral acceleration G, the first steering angle calculating unit 108 calculates the first steering angle δpath using Equation (5). When the vehicle motion parameter is a yaw rate Yr, the first steering angle calculating unit 108 calculates the first steering angle δpath using Equation (6). In the following equations, Kg denotes a lateral acceleration gain and Kyr denotes a yaw rate gain. Values stored in advance in the control device 100 are read and used as such gains.

$$\delta path = Kg \times Gd \quad (5)$$

$$\delta path = Kyr \times Yrd \quad (6)$$

The method of calculating the first steering angle δpath is not limited to the method using the gains as described above. For example, the first steering angle δpath may be calculated using a transfer function which is determined depending on dynamic characteristics of the vehicle and the vehicle motion parameter.

The control device 100 includes a vehicle motion parameter calculating unit 112. The vehicle motion parameter calculating unit 112 performs a process of calculating an actual value of the vehicle motion parameter. Here, an actual value of the lateral acceleration G as the vehicle motion parameter is referred to as an "actual lateral acceleration Gc" and an actual value of the yaw rate Yr as the vehicle motion parameter is referred to as an "actual yaw rate Yrc." When the external force Fdist acts on the vehicle, a vehicle motion due to the external force Fdist is superimposed on each of the actual values of the vehicle motion parameters. The vehicle motion parameter calculating unit 112 calculates the current actual lateral acceleration Gc or the current actual yaw rate Yrc based on the vehicle state information acquired by the information acquiring unit 102.

Figure 7:
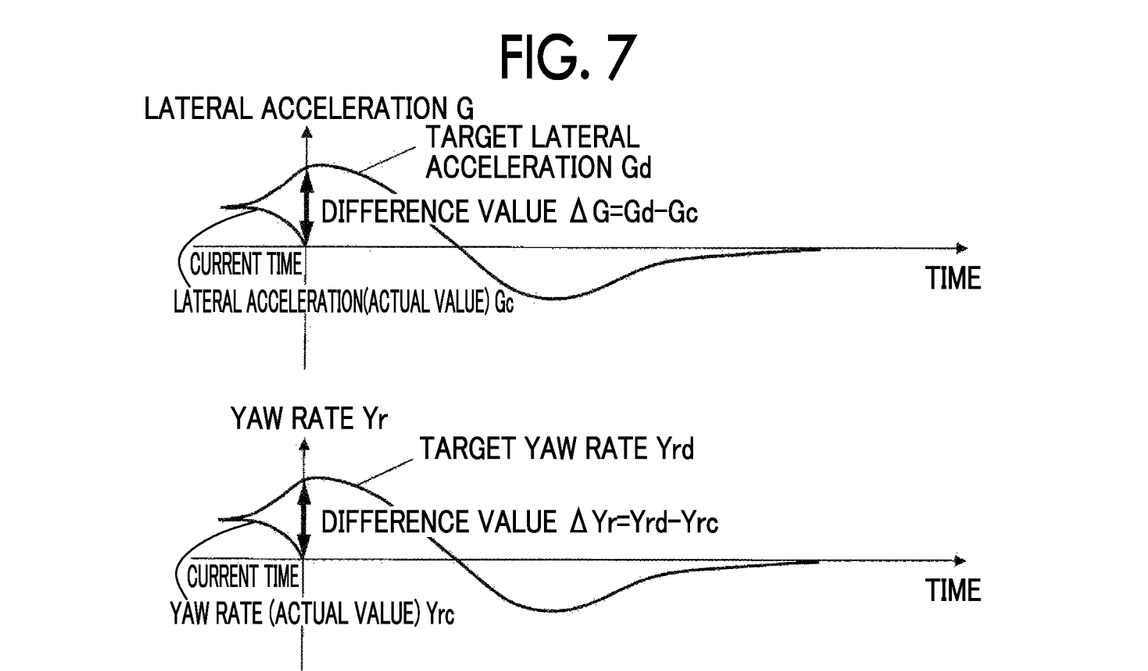
FIG. 7 is a diagram illustrating an example of a difference value ΔG and a difference value ΔYr.

The control device 100 includes a difference value calculating unit 114. Specifically, the difference value calculating unit 114 performs a process of calculating a difference value between a target value and an actual value of the vehicle motion parameter. When the lateral acceleration G is used as the vehicle motion parameter, the difference value ΔG between the target lateral acceleration Gd and the actual lateral acceleration Gc is expressed by Equation (7) into which a deadband is incorporated in consideration of a sensor error. When the yaw rate Yr is used as the vehicle motion parameter, the difference value ΔYr between the target yaw rate Yrd and the actual yaw rate Yrc is expressed by Equation (8) into which a deadband is incorporated in consideration of a sensor error. FIG. 7 illustrates an example of the difference value ΔG and the difference value ΔYr which are calculated in this way.

$$\Delta G = f_{deadband}(Gd - Gc) \times (Gd - Gc) \quad (7)$$

$$\Delta Yr = f_{deadband}(Yrd - Yrc) \times (Yrd - Yrc) \quad (8)$$

The control device 100 includes a second steering angle calculating unit 116. The second steering angle calculating unit 116 performs a process of calculating a steering angle required for cancelling out the external force Fdist. In the following description, this steering angle is referred to as a "second steering angle δdisturb." For example, when the vehicle motion parameter is a lateral acceleration G, the second steering angle calculating unit 116 calculates the second steering angle δdisturb using Equation (9). When the vehicle motion parameter is the yaw rate Yr, the second steering angle calculating unit 116 calculates the second steering angle δdisturb using Equation (10). In the following equations, Kgdist denotes a lateral acceleration gain and Kyrdist denotes a yaw rate gain. Values stored in advance in the control device 100 are read and used as the gains.

$$\delta disturb = Kg dist \times \Delta G \quad (9)$$

$$\delta disturb = Kyr dist \times \Delta Yr \quad (10)$$

The method of calculating the second steering angle δdisturb is not limited to the method using the gains as described above. For example, the second steering angle δdisturb may be calculated using a transfer function which is determined in accordance with dynamic characteristics of the vehicle and a vehicle motion parameter.

As described above, the difference value ΔG in the lateral acceleration and the difference value ΔYr in the yaw rate can be considered to be equivalent to the external force Fdist. Accordingly, by multiplying each of the difference values by a prescribed gain, it is possible to calculate a steering angle for cancelling out the external force Fdist.

The control device 100 includes a target steering angle calculating unit 120. The target steering angle calculating unit 120 performs a process of calculating a target steering angle δ required for causing the vehicle on which the external force Fdist acts to follow the target path. Specifically, the target steering angle calculating unit 120 calculates a summed value of the first steering angle δpath calculated by the first steering angle calculating unit 108 and the second steering angle δdisturb calculated by the second steering angle calculating unit 116, as the target steering angle δ. The control device 100 controls the steering device 53 of the traveling device 50 so that the actual steering angle reaches the calculated target steering angle δ (i.e., so that the actual steering angle coincides with the calculated target steering angle δ).

In this way, in the driving support control device according to the first embodiment, the second steering angle δdisturb for cancelling out the external force Fdist acting on the vehicle is calculated using the fact that the difference value ΔG in the lateral acceleration or the difference value ΔYr in the yaw rate can be considered to be equivalent to the external force Fdist. Accordingly, even when the external force Fdist acts on the vehicle, it is possible to cancel the external force Fdist with the use of additional turning corresponding to the second steering angle δdisturb. Accordingly, since a drift of the vehicle due to the external force can be curbed, it is possible to enhance an accuracy with which the vehicle follows the target path.

In the driving support control system according to the first embodiment, the process which is performed by the target vehicle motion parameter calculating unit 106 may be regarded as a "target value calculating process" according to the disclosure, the process which is performed by the first steering angle calculating unit 108 may be regarded as a "first steering angle calculating process" according to the disclosure, the process which is performed by the vehicle motion parameter calculating unit 112 may be regarded as an "actual value calculating process" according to the disclosure, the process which is performed by the second steering angle calculating unit 116 may be regarded as a "second steering angle calculating process" according to the disclosure, and the process which is performed by the target steering angle calculating unit 120 may be regarded as a "target steering angle calculating process" according to the disclosure. A "control process" according to the disclosure is implemented when the control device 100 controls the steering device 53 of the traveling device 50.

In the driving support control system according to the first embodiment, the lateral acceleration gain Kg or the yaw rate gain Kyr may be regarded as a "first gain" according to the disclosure, and the lateral acceleration gain Kgdist or the yaw rate gain Kyrdist may be regarded as "second gain" according to the disclosure.

Modified examples of first embodiment will be described. The driving support control system according to the first embodiment may be modified as described below.

The second steering angle calculating unit 116 calculates the second steering angle δdisturb using Equation (9) or (10). However, the second steering angle δdisturb may be calculated by another equation using the difference value ΔG in the lateral acceleration or the difference value ΔYr in the yaw rate. For example, the second steering angle calculating unit 116 may first calculate a lateral force Fdisturb for cancelling out the external force Fdist by multiplying the difference value ΔG in the lateral acceleration or the difference value ΔYr in the yaw rate by a prescribed first gain. Then, the second steering angle calculating unit 116 calculates a steering angle for generating the lateral force Fdisturb, that is, the second steering angle δdisturb, by multiplying the calculated lateral force Fdisturb by a prescribed second gain. In this way, the calculation process which is performed by the second steering angle calculating unit 116 is not particularly limited as long as the second steering angle δdisturb is calculated from the difference value ΔG in the lateral acceleration or the difference value ΔYr in the yaw rate which can be considered to be equivalent to the external force Fdist.

The calculation method which is performed by the vehicle motion parameter calculating unit 112 is not particularly limited. The lateral acceleration detected by the lateral acceleration sensor 41 may be used as the actual lateral acceleration Gc, or the lateral acceleration may be calculated using the yaw rate detected by the yaw rate sensor 42 and the vehicle speed detected by the vehicle speed sensor 43. The lateral acceleration may be estimated using the detected yaw rate and a two-wheeled model of the vehicle. Similarly, the yaw rate detected by the yaw rate sensor 42 may be used as the actual yaw rate Yrc, or the yaw rate may be calculated using the lateral acceleration detected by the lateral acceleration sensor 41 and the vehicle speed detected by the vehicle speed sensor 43. The yaw rate may be estimated using the detected lateral acceleration and a two-wheeled model of the vehicle.

A driving support control system 1 according to a second embodiment will be described below.

Figure 8:
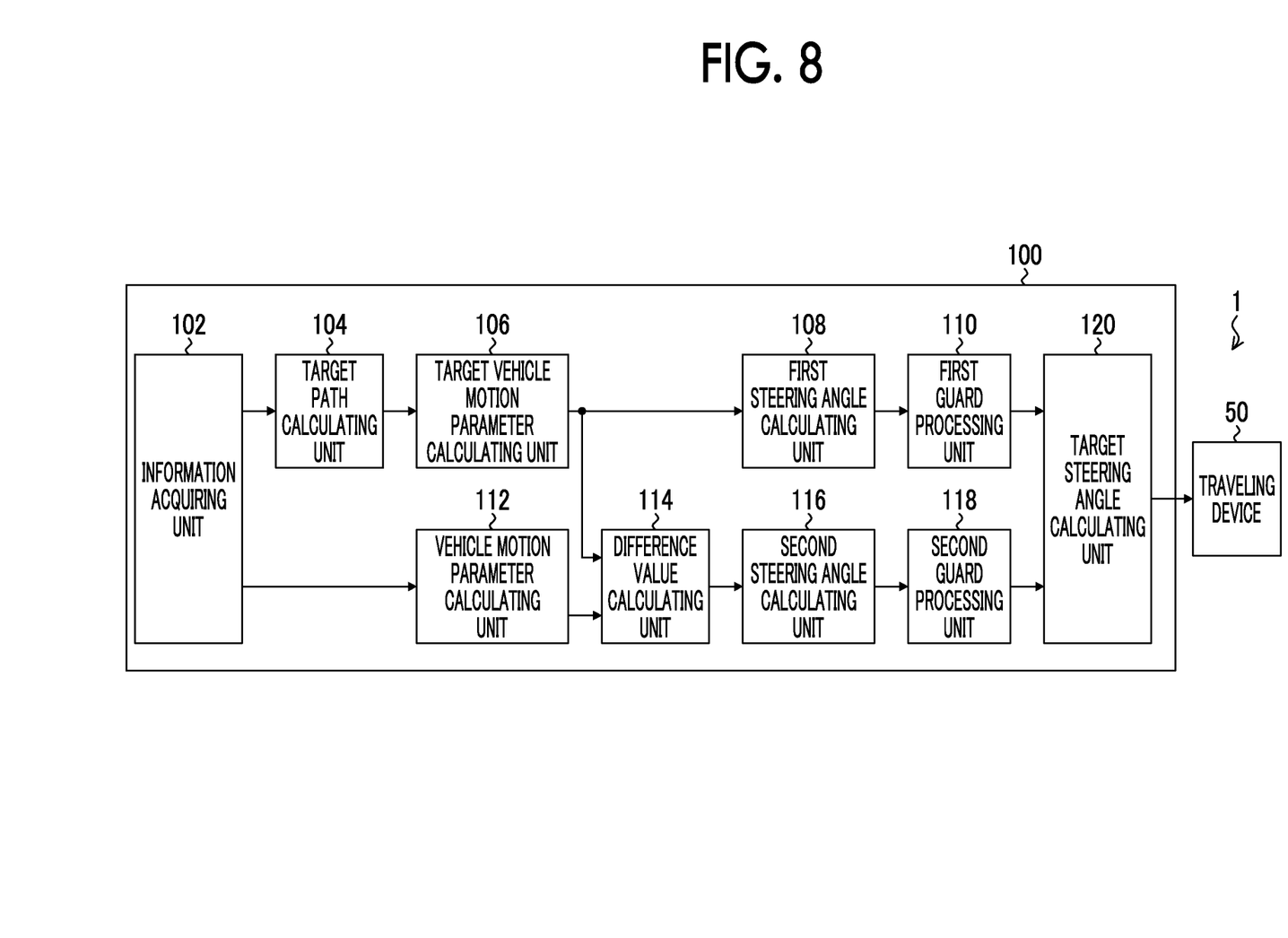
FIG. 8 is a diagram illustrating functional blocks of a control device of a driving support control system according to a second embodiment.

FIG. 8 is a diagram illustrating functional blocks of a control device of the driving support control system according to the second embodiment. The control device 100 of the driving support control system 1 illustrated in FIG. 8 includes the same functional blocks as the control device 100 according to the first embodiment illustrated in FIG. 5, except that a first guard processing unit 110 and a second guard processing unit 118 are additionally provided.

The first guard processing unit 110 performs a first guarding process of guarding against an abnormal value of the first steering angle δpath and a sudden change of the first steering angle δpath. The first steering angle δpath is calculated by the first steering angle calculating unit 108. More specifically, in the first guarding process, the absolute value of the first steering angle δpath is guarded by a prescribed first steering angle upper limit. The first steering angle upper limit is a value for excluding an abnormal value of the first steering angle δpath, and a preset value is used as the first steering angle upper limit. In the first guarding process, the absolute value of the variation of the first steering angle δpath (i.e., the absolute value of an amount of change in the first steering angle δpath) is guarded by a prescribed first variation upper limit. The first variation upper limit is a value for excluding a sudden change of the first steering angle δpath, and a preset value is used as the first variation upper limit. The first guarding process may be configured to guard one of the first steering angle δpath and the variation thereof.

The second guard processing unit 118 performs a second guarding process of guarding against an abnormal value of the second steering angle δdisturb and a sudden change of the second steering angle δdisturb. The second steering angle δdisturb is calculated by the second steering angle calculating unit 116. More specifically, in the second guarding process, the absolute value of the second steering angle δdisturb is guarded by a prescribed second steering angle upper limit. The second steering angle upper limit is a value for excluding an abnormal value of the second steering angle δdisturb, and a preset value is used as the second steering angle upper limit. In the second guarding process, the absolute value of the variation of the second steering angle δdisturb (i.e., the absolute value of an amount of change in the second steering angle δdisturb) is guarded by a prescribed second variation upper limit. The second variation upper limit is a value for excluding a sudden change of the second steering angle δdisturb, and a preset value is used as the second variation upper limit. The second guarding process may be configured to guard one of the second steering angle δdisturb and the variation thereof.

The target steering angle calculating unit 120 calculates the target steering angle δ by summing the first steering angle δpath that has been subjected to the first guarding process performed by the first guard processing unit 110 and the second steering angle δdisturb that has been subjected to the second guarding process performed by the second guard processing unit 118.

In this way, in the driving support control system according to the second embodiment, the control device 100 separately performs the guarding processes on the first steering angle δpath and the second steering angle δdisturb. Accordingly, the following advantages can be obtained.

Figure 9:
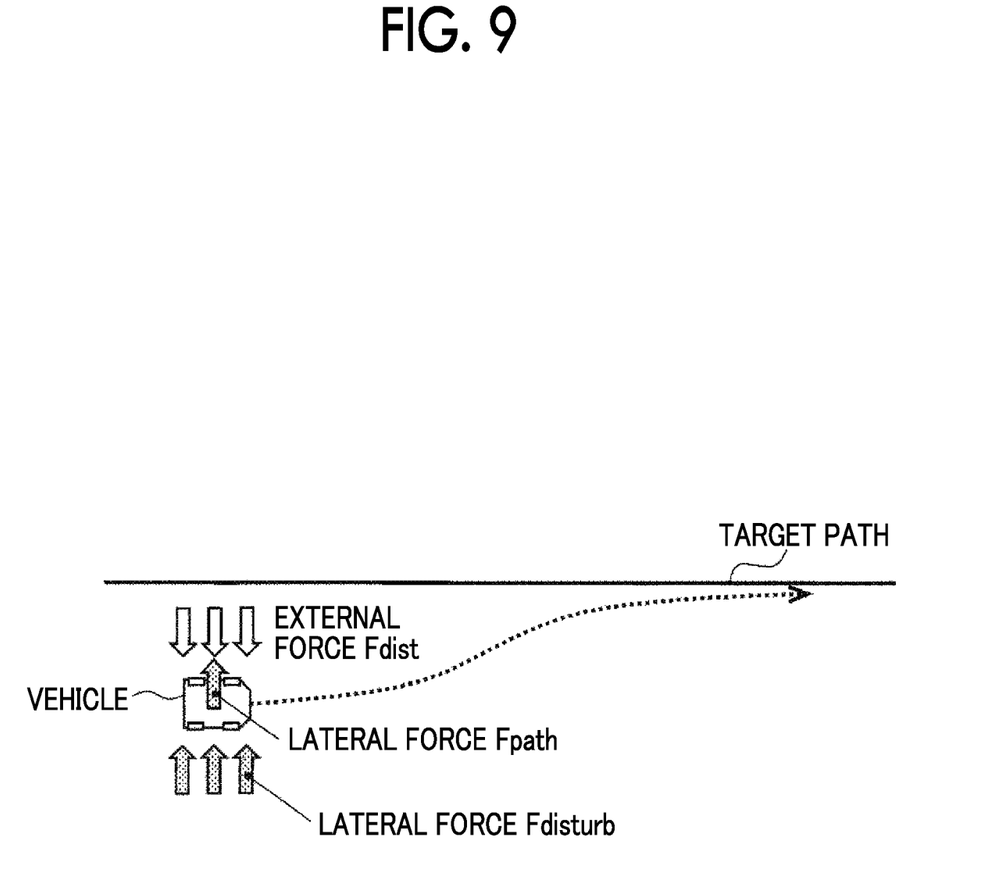
FIG. 9 is a diagram illustrating a force relationship when an external force acts on a vehicle.

FIG. 9 is a diagram illustrating a force relationship when an external force acts on the vehicle. The lateral force Fpath illustrated in the drawing is a lateral force for causing the vehicle to follow a target path and is generated in the vehicle by controlling the steering device 53 at the first steering angle δpath. On the other hand, the lateral force Fdisturb is a lateral force for cancelling out the external force Fdist acting on the vehicle and is generated in the vehicle by controlling the steering device 53 at the second steering angle δdisturb. If the guarding process is performed on the target steering angle δ obtained by summing of the first steering angle δpath and the second steering angle δdisturb, it cannot be determined which of the first steering angle δpath and the second steering angle δdisturb has an error and thus an appropriate guard value cannot be set. In contrast, in the driving support control system according to the second embodiment, since an error or an abnormal output of the first steering angle δpath and an error or an abnormal output of the second steering angle δdisturb are individually curbed, it is possible to generate the lateral force Fpath for causing the vehicle to follow a target path and the lateral force Fdisturb for cancelling out an external force, with high accuracy. Accordingly, since a drift of the vehicle due to an external force can be curbed, it is possible to enhance an accuracy with which the vehicle follows a target path.

In the driving support control system according to the second embodiment, the process which is performed by the first guard processing unit 110 may be regarded as a "first guarding process" according to the disclosure, and the process which is performed by the second guard processing unit 118 may be regarded as a "second guarding process" according to the disclosure.

The driving support control system according to the second embodiment may be modified as will be described below.

The driving support control system according to the second embodiment may be configured to include only one of the first guard processing unit 110 and the second guard processing unit 118.

A driving support control system 1 according to a third embodiment will be described below.

Figure 10:
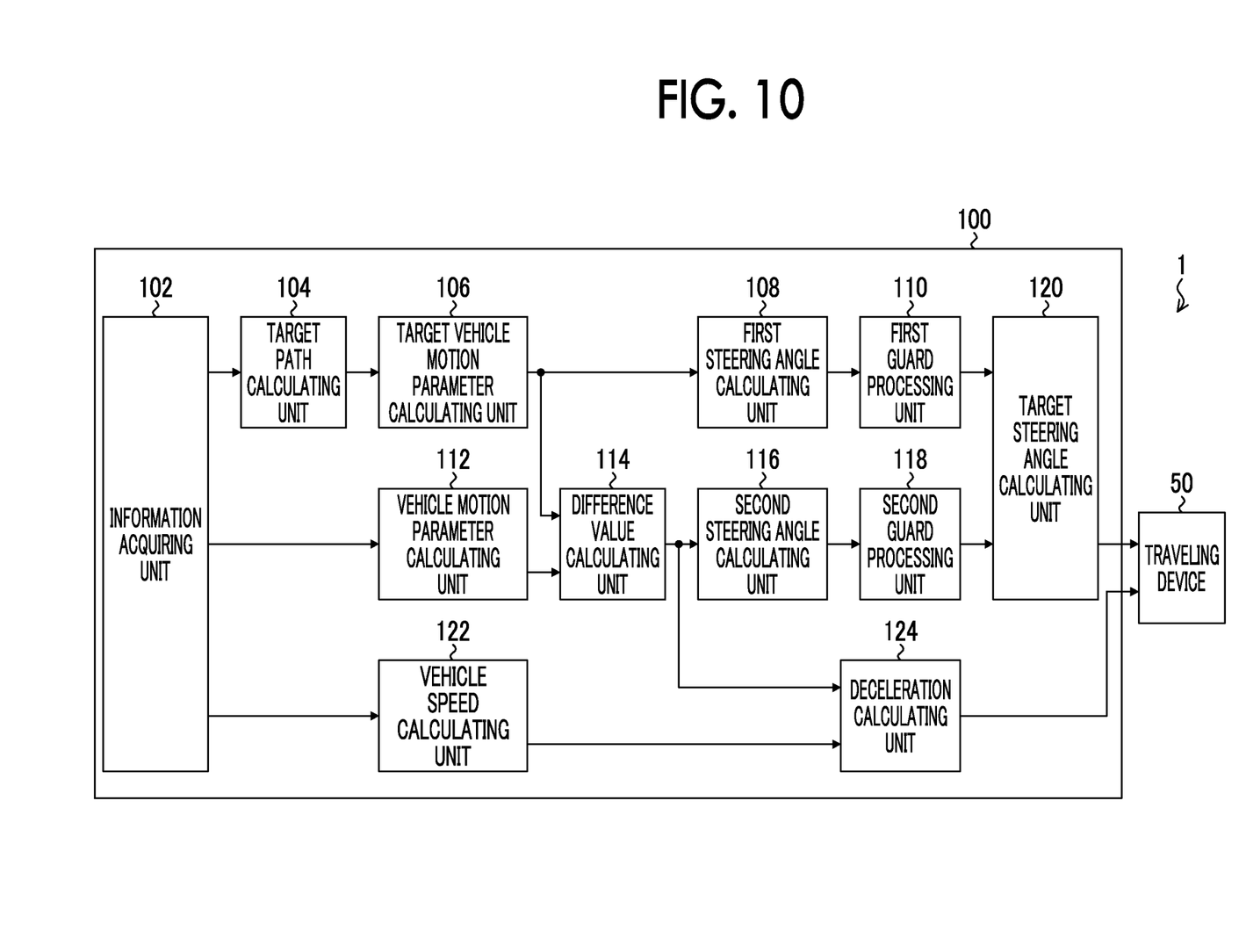
FIG. 10 is a diagram illustrating functional blocks of a control device of a driving support control system according to a third embodiment.

FIG. 10 is a diagram illustrating functional blocks of a control device of the driving support control system according to the third embodiment. The control device 100 of the driving support control system 1 illustrated in FIG. 10 includes the same functional blocks as the control device 100 according to the second embodiment illustrated in FIG. 8, except that a vehicle speed calculating unit 122 and a deceleration calculating unit 124 are additionally provided.

The vehicle speed calculating unit 122 performs a process of calculating a current vehicle speed V of the vehicle based on the vehicle state information acquired by the information acquiring unit 102.

The deceleration calculating unit 124 performs a process of calculating a deceleration of the vehicle when the difference value calculated by the difference value calculating unit 114 is equal to or greater than a prescribed determination value (an example of a first prescribed determination value according to the disclosure). Specifically, in the case in which the lateral acceleration G is used as the vehicle motion parameter, a deceleration for decelerating the vehicle is calculated when the difference value ΔG between the target lateral acceleration Gd and the actual lateral acceleration Gc is equal to or greater than the prescribed determination value (i.e., when a condition "ΔG≥ the prescribed determination value" is satisfied). It can be determined that the external force Fdist becomes greater, as the difference value ΔG becomes greater. Accordingly, the difference value ΔG can serve as an indicator for determining whether the vehicle should be decelerated. The control device 100 controls the driving device 51 and the braking device 52 of the traveling device 50 so that the deceleration calculated by the deceleration calculating unit 124 is achieved. In this way, by decelerating the vehicle when the difference value ΔG is equal to or greater than the prescribed determination value, it is possible to enhance ability of the vehicle to follow a target path.

In the case in which the yaw rate Yr is used as the vehicle motion parameter, a deceleration for decelerating the vehicle is calculated when the difference value ΔYr between the target yaw rate Yrd and the actual yaw rate Yrc is equal to or greater than a prescribed determination value, that is, when a condition "ΔYr≥ the prescribed determination value" is satisfied. By decelerating the vehicle when the difference value ΔYr is equal to or greater than the prescribed determination value, it is possible to enhance ability of the vehicle to follow a target path.

In the driving support control system according to the third embodiment, the processes which are performed by the vehicle speed calculating unit 122 and the deceleration calculating unit 124 may be regarded as an "acceleration limiting process" according to the disclosure.

Modified examples of third embodiment will be described. The driving support control system according to the third embodiment may be modified as described below.

In the driving support control system according to the third embodiment, in the case where the acceleration can be limited when the difference value ΔG or ΔYr is equal to or greater than the prescribed determination value, it is possible to enhance ability of the vehicle to follow a target path. Therefore, the driving support control system according to the third embodiment may be configured to, for example, prohibit the acceleration of the vehicle by setting the acceleration to zero when the difference value ΔG or ΔYr is equal to or greater than a prescribed determination value (an example of a second prescribed determination value according to the disclosure).

The driving support control system according to the third embodiment may employ a configuration which does not include the first guard processing unit 110 and the second guard processing unit 118, similarly to the driving support control system according to the first embodiment.

Figure 11:
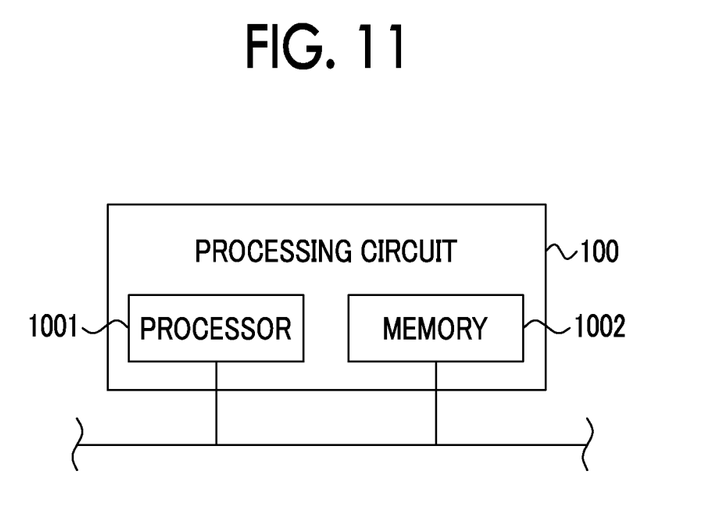
FIG. 11 is a diagram illustrating an example of a hardware configuration of each of the control devices of the driving support control systems according to the first to third embodiments.

Modified examples of each of the first to third embodiments will be described. Each of the control devices 100 of the driving support control systems according to the first to third embodiments may be configured as follows. FIG. 11 is a diagram illustrating an example of a hardware configuration of each of the control devices of the driving support control systems according to the first to third embodiments. The functions of the control device 100 are implemented by a processing circuit. In the example illustrated in FIG. 11, the processing circuit of the control device 100 includes at least one processor 1001 and at least one memory 1002.

When the processing circuit includes at least one processor 1001 and at least one memory 1002, the functions of the control device 100 may be implemented by software, firmware, or a combination of software and firmware. At least one of software and firmware is described as a program. At least one of software and firmware is stored in the at least one memory 1002. The functions of the control device 100 are implemented when the at least one processor 1001 reads and executes a program stored in the at least one memory 1002. The at least one processor 1001 is also referred to as a central processing unit (CPU), a processing device, a calculation device, a microprocessor, a microcomputer, or a digital signal processor (DSP). For example, the at least one memory 1002 includes a nonvolatile or volatile semiconductor memory such as a random access memory (RAM), a read only memory (ROM), a flash memory, an erasable programmable read only memory (EPROM), or an electrically erasable programmable read only memory (EEPROM), a magnetic disk, a flexible disk, or an optical disc.

Figure 12:
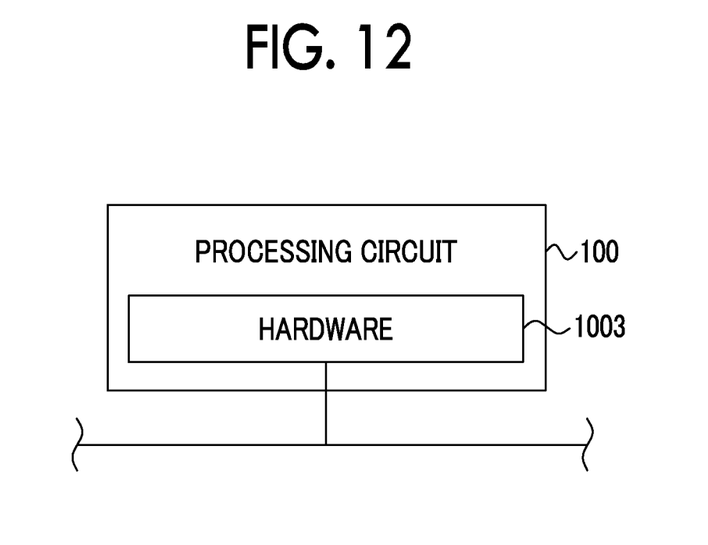
FIG. 12 is a diagram illustrating another example of the hardware configuration of each of the control devices of the driving support control systems according to the first to third embodiments.

FIG. 12 is a diagram illustrating another example of the hardware configuration of each of the control devices of the driving support control systems according to the first to third embodiments. In the example illustrated in FIG. 12, a processing circuit of the control device 100 includes at least one piece of dedicated hardware 1003.

When the processing circuit includes at least one piece of dedicated hardware 1003, examples of the processing circuit include a single circuit, a composite circuit, a programmed processor, a parallel programmed processor, an application specific integrated circuit (ASIC), a field-programmable gate array (FPGA), and a combination thereof. The functions of the functional units of the control device 100 may be implemented by separate processing circuits. The functions of the functional units of the control device 100 may be implemented by a single processing circuit.

Some of the functions of the control device 100 may be implemented by dedicated hardware 1003 and others thereof may be implemented by software or firmware. In this way, the processing circuit implements the functions of the control device 100 with the use of hardware 1003, software, firmware, or a combination thereof.

What is claimed is:

1. A driving support control system that is mounted in a vehicle, the driving support control system comprising:
   a steering device configured to adjust a steering angle of the vehicle; and
   a control device including a processor programmed to control the steering device so that the vehicle travels to follow a target path,
   wherein the control device is programmed to:
      calculate a target value of a lateral acceleration or a yaw rate as a target value of a vehicle motion parameter that causes the vehicle to travel to follow the target path;
      calculate a first steering angle that causes the vehicle motion parameter to coincide with the target value;
      calculate an actual value of the vehicle motion parameter;
      calculate a second steering angle based on a difference value between the actual value and the target value, wherein the second steering angle cancels out an external force acting on the vehicle from an outside;
      calculate a target steering angle based on a summed value of the first steering angle and the second steering angle;
      control the steering device so that the steering angle of the vehicle coincides with the target steering angle;
      limit acceleration of the vehicle when the difference value is equal to or greater than a first prescribed determination value;
      detect a vehicle speed of the vehicle and calculate a deceleration of the vehicle based on the vehicle speed and the difference value.

2. The driving support control system according to claim 1, wherein the control device is further programmed to:
   calculate, as the first steering angle, a value obtained by multiplying the vehicle motion parameter by a prescribed first gain; and
   calculate, as the second steering angle, a value obtained by multiplying the difference value by a prescribed second gain.

3. The driving support control system according to claim 1, wherein the control device is further programmed to:
   include a first guarding process of providing an upper limit on an absolute value of the first steering angle or an absolute value of an amount of change in the first steering angle; and
   include a second guarding process of providing an upper limit on an absolute value of the second steering angle or an absolute value of an amount of change in the second steering angle.

4. The driving support control system according to claim 1, wherein the control device is further programmed to prohibit the acceleration of the vehicle when the difference value is equal to or greater than a second prescribed determination value.

5. The driving support control system according to claim 1, wherein the target value is calculated based on an assumption that no external force acts on the vehicle from the outside, and the second steering angle is calculated to cancel out the external force that acts on the vehicle from the outside.

6. The driving support control system according to claim 1, wherein the control device controls the steering device so that the vehicle autonomously travels to follow the target path.

7. The driving support control system according to claim 6, wherein the external force acting on the vehicle causes a drift of the vehicle from the travel path.

* * * * *